May 30, 1950

N. B. BLAKE 2,509,389

ELECTRONIC MEANS FOR SUPPRESSING
IN PHASE INTERFERENCE

Filed Sept. 11, 1945

WITNESS:

Robt R. Kitchel

INVENTOR

Norman B. Blake

BY

Busser & Harding

ATTORNEYS

UNITED STATES PATENT OFFICE 2,509,389

ELECTRONIC MEANS FOR SUPPRESSING INPHASE INTERFERENCE

Norman B. Blake, Beaumont, Tex., assignor to Sun Oil Company, Philadelphia, Pa., a corporation of New Jersey Application September 11, 1945, Serial No. 615,674

6 Claims. (Cl. 179—78)

This invention relates to a transmission circuit particularly designed for the suppression of so-called inphase interference. The invention is particularly adapted to the reduction of such interference in detector lines such as are involved in seismographic prospecting.

Transmission lines, such as those used in seismographic prospecting, pick up interference from various sources, the most annoying interference generally being from commercial power lines. This power line interference is frequently several hundred times as large as the useful signals, which are to be transmitted and as a result may greatly overload the high gain amplifiers which are required for the desired signals.

Attempts to balance out the interfering signals of the type described have, in general, involved the use of carefully balanced circuit elements and, in particular, transformers. Good commercial transformers with balanced primary windings may be expected to give a ratio of useful signal to inphase signal of five hundred to one. This, however, is substantially short of what is desired. In accordance with the present invention, the ratio of useful signal to inphase signal may be made of the order of fifty thousand to one. Not only may power line interference be suppressed in accordance with the invention, but any other inphase interference, including such transient interference as results from lightning discharges. While the invention will be generally described with reference to seismographic use, it is obvious that it may be used to eliminate inphase interference generally in communication circuits, and as pointed out hereafter, the invention is applicable to the provision of phantom circuits, such as are used in telephonic communication.

Figure 1:
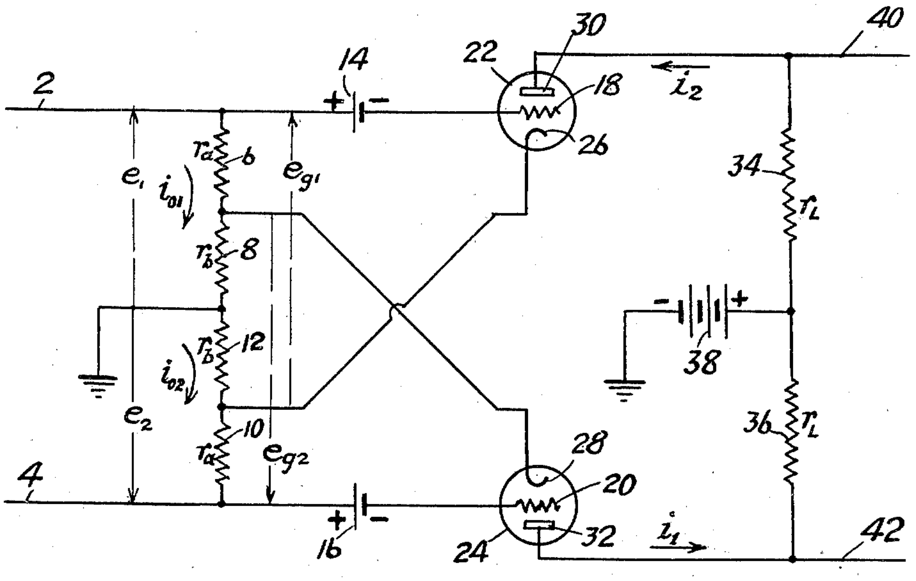
Figure 2:
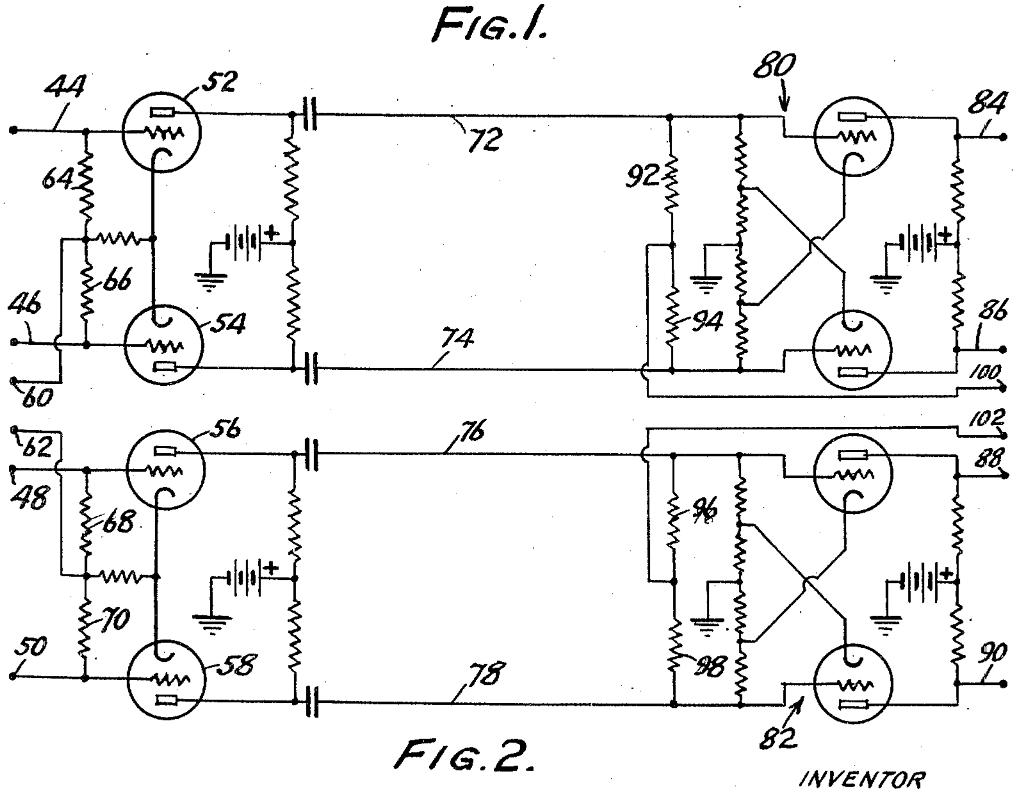

The general object of the invention is as indicated above, namely, the suppression of inphase interference. This and other objects of the invention particularly relating to details of construction and operation will become apparent from the following description, read in conjunction with the accompanying drawing, in which:

Figure 1 is a diagram illustrating the application of the invention to a transmission circuit such as that involved in seismographic prospecting; and Figure 2 is a diagram showing the application of the invention to a phantom circuit such as used in telephonic communication.

Referring first to Figure 1, the input lines are indicated at 2 and 4. These, as well as all of the other symmetrically arranged parts of the circuit, should be adjusted as nearly as possible to a symmetrical condition of balance, i. e., in the case of the two lines, the impedance to ground should be balanced so that the interfering signals on the two lines would be identical. Connected between the line 2 and ground are resistors 6 and 8, in series. Similarly, between the line 4 and ground there are the series resistors 10 and 12. Resistors 6 and 10 should be identical, and resistors 8 and 12 should be identical. The relationship between resistors 6 and 8 and between resistors 10 and 12 will be referred to hereafter. The lines are connected through suitable biasing batteries 14 and 16 to the grids 18 and 20 of amplifying tubes 22 and 24. These tubes, shown as triodes by way of example, may be tetrodes, pentodes or other tubes to which, as will be apparent hereafter, the invention equally applies.

The cathode 26 is connected to the junction of resistors 10 and 12. The cathode 28 of the tube 24 is connected to the junction of the resistors 6 and 8. The plates 30 and 32 of the respective tubes are connected to the load resistors 34 and 36 which are grounded through the high voltage anode supply indicated as a battery 38. Lines 40 and 42 may lead to a conventional amplifier, which in itself forms no part of the invention, but which may be provided to bring the desired signals to the proper amplitude for recording or use.

The tubes 22 and 24 should be as nearly identical as possible and, in particular, should have substantially identical amplification factors. In the case of multiple element tubes, the other connections are, of course, made in symmetrical fashion with respect to ground.

The characteristics of the circuit leading to the suppression of inphase voltage will be clear from the following analysis.

Suppose $e_k$ is the inphase voltage and $e_s$ is one-half the signal voltage. Then:

$$e_1=e_k+e_s \quad (1)$$

$$e_2=e_k-e_s \quad (2)$$

The mesh equations are then:

$$e_{g2}=e_2+r_b(i_1-i_{01}) \quad (3)$$

$$i_1(r_b+R)-i_{01}r_b=-\mu e_{g2} \quad (4)$$

$$i_{01}(r_a+r_b)-r_b i_1=e_1 \quad (5)$$

plus three similar equations which need not be used. In the above $R=r_p+r_L$, $\mu$ is the amplification factor of each of the tubes, and the other quantities are as indicated in Figure 1.

If $\rho$ is written for $$\frac{r_b}{r_a+r_b}$$

the solution is obtained in the form:

$$e_{g2}=\frac{e_1\rho R+e_2(\rho r_b-r_b-R)}{r_b(\rho-1)(\mu+1)-R} \tag{6}$$

The superposition theorem allows consideration of the inphase components independently. Using the subscript $_k$, to indicate the inphase components there is obtained:

$$\frac{i_{1k}}{e_k}=\frac{1}{R}\left[1-\frac{(\mu+1)(\rho R+\rho r_b-r_b-R)}{r_b(\rho-1)(\mu+1)-R}\right] \tag{7}$$

This ratio vanishes if the fraction within the brackets is equal to unity, which is the case if:

$$\rho=\frac{\mu}{\mu+1} \tag{8}$$

From the value of $\rho$, this condition is equivalent to:

$$r_b=\mu r_a \tag{9}$$

The above analysis is, of course, based on an assumption of linearity of the complete circuit and gives the condition for the ratio of the resistors which would result in theoretical complete suppression of the inphase signals so that the currents through the tubes would not contain any inphase components. Actually, of course, complete balance is not attainable since the tubes are inherently non-linear. Accordingly, some inphase current will appear in the plate circuits of the tubes. Nevertheless, in practical application an extreme degree of suppression of the inphase components actually occurs to such extent that these components are reduced well below the signal voltage level so as not to overload the subsequent amplifier. Some inphase voltage is also fed into the plate circuit by interelectrode capacitances. This condition may be materially reduced by the use of pentode amplifier tubes instead of the triodes shown.

While the inphase signals are suppressed as indicated, a continuation of the analysis given above will show that the amplification of the desired signals is, nevertheless, not suppressed. A typical circuit provided in accordance with the above was found to reduce the inphase signals to approximately one thousandth of their value while at the same time amplifying the useful signal fifty times, thus giving a ratio of signal change to interference change of above fifty thousand to one.

The foregoing analysis indicates that the desired characteristics are present if one of the tubes is completely removed from the circuit. It will be understood, therefore, that the invention is not limited to the use of a pair of tubes as indicated.

The characteristics of the circuit just described clearly make it applicable to the construction of a phantom circuit such as illustrated in Figure 2, the side circuits comprising the lines 44 and 46 and the lines 48 and 50. These have their signals amplified by the tubes 52, 54, 56 and 58 connected in pairs as illustrated, in push-pull relationship. A phantom circuit comprises the lines 60 and 62 connected to the junctions of the equal resistors 64 and 66, and 68 and 70 respectively. Intermediate lines 72, 74, 76 and 78 are connected to the outer terminals of the resistors 92, 94, 96 and 98 as indicated. From the junctions of these pairs of resistors, the phantom circuit continues through the lines 100 and 102. The side circuits are connected to the inphase signal suppressing circuits 80 and 82 of the type illustrated in Figure 1 and the side circuits deliver outputs through the lines 84 and 86, and 88 and 90 respectively. It will be evident from Figure 2 and the preceding discussion of Figure 1 that the signals in the phantom circuit are of inphase character so far as the side circuits are concerned and accordingly there is suppression of the phantom circuit signals in the side circuits.

From the above, it will be clear that the invention is of quite general application and accordingly the invention is not to be regarded as restricted except to the extent required by the following claims.

What I desire to claim and protect by Letters Patent is:

1. A transmission system comprising two side circuits and a phantom circuit, each side circuit comprising a pair of signal input lines, a pair of amplifying tubes having control grids connected to the respective lines, a pair of resistors connected in series between each line and a neutral point, and a connection between the cathode of each tube and the junction point of the resistors of the pair which lies between the neutral point and the line connected to the control grid of the other tube, said resistors being related to suppress inphase signals in the cathode circuits of said tubes, and said phantom circuit being connected symmetrically with respect to said circuits so that its signals appear as inphase signals in said side circuits.

2. A transmission system comprising two side circuits and a phantom circuit, each side circuit comprising a pair of signal input lines, a pair of amplifying tubes having control grids connected to the respective lines, a pair of resistors connected in series between each line and a neutral point, and a connection between the cathode of each tube and the junction point of the resistors of the pair which lies between the neutral point and the line connected to the control grid of the other tube, said resistors of each pair having a ratio approximately equal to the amplification factors of the tubes to suppress inphase signals in the cathode circuits of said tubes, and said phantom circuit being connected symmetrically with respect to said side circuits so that its signals appear as inphase signals in said side circuits.

3. A transmission system comprising two side circuits and a phantom circuit, each side circuit comprising a pair of signal input lines, a pair of amplifying tubes having approximately equal amplification factors and having control grids connected to the respective lines, a pair of resistors connected in series between each line and a neutral point, and a connection between the cathode of each tube and the junction point of the resistors of the pair which lies between the neutral point and the line connected to the control grid of the other tube, said resistors of each pair having a ratio approximately equal to the amplification factors of the tubes, and said phantom circuit being connected symmetrically with respect to said side circuits so that its signals appear as inphase signals in said side circuits.

4. A transmission system comprising two side circuits and a phantom circuit, each side circuit comprising a pair of signal input lines, a pair of amplifying tubes having control grids connected to the respective lines, a pair of impedances connected in series between each line and a neutral point, and a connection between the cathode of each tube and the junction point of the impedances of the pair which lies between the neutral point and the line connected to the control grid of the other tube, said impedances being related to suppress inphase signals in the cathode circuits of said tubes, and said phantom circuit being connected symmetrically with respect to said circuits so that its signals appear as inphase signals in said side circuits.

5. A transmission system comprising two side circuits and a phantom circuit, each side circuit comprising a pair of signal input lines, a pair of amplifying tubes having control grids connected to the respective lines, a pair of impedances connected in series between each line and a neutral point, and a connection between the cathode of each tube and the junction point of the impedances of the pair which lies between the neutral point and the line connected to the control grid of the other tube, said impedances of each pair having a ratio approximately equal to the amplification factors of the tubes to suppress inphase signals in the cathode circuits of said tubes, and said phantom circuit being connected symmetrically with respect to said side circuits so that its signals appear as inphase signals in said side circuits.

6. A transmission system comprising two side circuits and a phantom circuit, each side circuit comprising a pair of signal input lines, a pair of amplifying tubes having approximately equal amplification factors and having control grids connected to the respective lines, a pair of impedances connected in series between each line and a neutral point, and a connection between the cathode of each tube and the junction point of the impedances of the pair which lies between the neutral point and the line connected to the control grid of the other tube, said impedances of each pair having a ratio approximately equal to the amplification factors of the tubes, and said phantom circuit being connected symmetrically with respect to said side circuits so that its signals appear as inphase signals in said side circuits.

NORMAN B. BLAKE.

REFERENCES CITED

The following references are of record in the file of this patent:

UNITED STATES PATENTS

| Number | Name | Date |
|---|---|---|
| 1,549,477 | Fischer | Aug. 11, 1925 |
| 2,201,345 | Percival | May 21, 1940 |
| 2,296,920 | Goodale | Sept. 29, 1942 |
| 2,306,456 | Mayne | Dec. 29, 1942 |
| 2,377,394 | Adkerson | June 5, 1945 |

FOREIGN PATENTS

| Number | Country | Date |
|---|---|---|
| 542,035 | Great Britain | Dec. 23, 1941 |

OTHER REFERENCES

Telephony, McMeen and Miller, 1922, page 667, entitled "Phantom, Simplex and Composite Circuits."